United States Patent
Hwang et al.

(10) Patent No.: US 8,594,424 B2
(45) Date of Patent: Nov. 26, 2013

(54) APPARATUS AND METHOD FOR RECOGNIZING CHARACTERS USING A CAMERA

(75) Inventors: Seong-Taek Hwang, Pyeongtaek-si (KR); Sang-Wook Oh, Ansan-si (KR); Hyun-Soo Kim, Yongin-si (KR); Sang-Ho Kim, Suwon-si (KR); Hee-Min Kwon, Seoul (KR); Yun-Je Oh, Suwon-si (KR); Byung-Jik Kim, Seongnam-si (KR)

(73) Assignee: Samsung Electronics Co., Ltd (KR)

( * ) Notice: Subject to any disclaimer, the term of this patent is extended or adjusted under 35 U.S.C. 154(b) by 1021 days.

(21) Appl. No.: 12/632,118

(22) Filed: Dec. 7, 2009

(65) Prior Publication Data

US 2010/0141788 A1 Jun. 10, 2010

(30) Foreign Application Priority Data

Dec. 8, 2008 (KR) ........................ 10-2008-0123957

(51) Int. Cl.
*G06K 9/34* (2006.01)
*G06K 9/00* (2006.01)

(52) U.S. Cl.
USPC ........................................... 382/173; 382/181

(58) Field of Classification Search
None
See application file for complete search history.

(56) References Cited

U.S. PATENT DOCUMENTS

| | | | |
|---|---|---|---|
| 4,850,025 A * | 7/1989 | Abe | 382/220 |
| 4,903,206 A * | 2/1990 | Itoh et al. | 715/234 |
| 5,583,978 A * | 12/1996 | Collins et al. | 345/170 |
| 5,825,999 A * | 10/1998 | Uzaki et al. | 345/467 |
| 5,999,647 A * | 12/1999 | Nakao et al. | 382/187 |
| 6,246,794 B1 * | 6/2001 | Kagehiro et al. | 382/185 |
| 6,266,442 B1 * | 7/2001 | Laumeyer et al. | 382/190 |
| 6,341,176 B1 * | 1/2002 | Shirasaki et al. | 382/229 |
| 6,473,517 B1 * | 10/2002 | Tyan et al. | 382/105 |
| 6,640,010 B2 * | 10/2003 | Seeger et al. | 382/229 |
| 6,745,161 B1 * | 6/2004 | Arnold et al. | 704/7 |
| 6,834,121 B2 * | 12/2004 | Guillevic et al. | 382/224 |
| 6,870,947 B2 * | 3/2005 | Kelland | 382/137 |
| 7,010,519 B2 * | 3/2006 | Tada et al. | 1/1 |
| 7,031,553 B2 * | 4/2006 | Myers et al. | 382/289 |
| 7,069,240 B2 * | 6/2006 | Spero et al. | 705/30 |
| 7,142,716 B2 * | 11/2006 | Katsuyama et al. | 382/190 |
| 7,606,439 B2 * | 10/2009 | Lefebure et al. | 382/274 |
| 7,616,136 B2 * | 11/2009 | Lee et al. | 341/67 |

(Continued)

FOREIGN PATENT DOCUMENTS

| KR | 1995-0007888 | 7/1995 |
|---|---|---|
| KR | 1020060133430 | 12/2006 |
| KR | 1020070099138 | 10/2007 |
| KR | 100838580 | 6/2008 |

*Primary Examiner* — Manav Seth
(74) *Attorney, Agent, or Firm* — The Farrell Law Firm, P.C.

(57) ABSTRACT

An apparatus and method for recognizing characters of an image captured using a camera in a mobile terminal are provided, wherein an image of a signboard is captured, a text area is extracted from the captured image of the signboard, characters are recognized from the extracted text area, similar characters up to a predetermined priority level are generated for each recognized character of the extracted text area, location information of an area within a predetermined range from a current position of a user is acquired, store names are extracted from the location information, text is generated by combining the similar characters according to weights, the text are compared with the extracted store names, and a comparison result is output.

17 Claims, 7 Drawing Sheets

(56) References Cited

U.S. PATENT DOCUMENTS

| | | |
|---|---|---|
| 7,970,213 B1 * | 6/2011 | Ruzon et al. .................. 382/229 |
| 8,117,458 B2 * | 2/2012 | Osborn et al. ................ 713/183 |
| 8,290,273 B2 * | 10/2012 | Prasad et al. ................. 382/181 |
| 8,335,402 B1 * | 12/2012 | Manmatha et al. ........... 382/283 |
| 2002/0154817 A1 * | 10/2002 | Katsuyama et al. .......... 382/190 |
| 2004/0057619 A1 * | 3/2004 | Lim et al. ...................... 382/182 |
| 2007/0036469 A1 | 2/2007 | Kim et al. |
| 2008/0011841 A1 * | 1/2008 | Self et al. ...................... 235/385 |

\* cited by examiner

FIG.1
(PRIOR ART)

| PRIORITY LEVEL : | 1 | 2 | 3 | 4 | 5 |
|---|---|---|---|---|---|
| | 돼 | 쇄 | 태 | 데 | 뼈 |
| | 지 | 치 | 시 | 자 | 저 |
| | 꿈 | 꿀 | 곰 | 꼼 | 곱 |
| | 푸 | 꾸 | 부 | 무 | 두 |
| | 눈 | 는 | 늘 | 럽 | 톱 |
| | 낭 | 날 | 닝 | 난 | 남 |

FIG.2A
(PRIOR ART)

| PRIORITY LEVEL : | 1 | 2 | 3 | 4 | 5 |
|---|---|---|---|---|---|
| | f | t | Y | P | b |
| | b | A | k | d | b |
| | o | e | u | r | a |
| | e | o | b | e | f |
| | k | h | n | m | a |

APPARATUS AND METHOD FOR RECOGNIZING CHARACTERS USING A CAMERA

PRIORITY

This application claims priority under 35 U.S.C. §119(a) to a Korean Patent Application filed in the Korean Intellectual Property Office on Dec. 8, 2008 and assigned Serial No. 10-2008-0123957, the entire disclosure of which is incorporated herein by reference.

BACKGROUND OF THE INVENTION

1. Field of the Invention

The present invention relates generally to increasing a character recognition rate of an image received through a camera, and more particularly, to an apparatus and method for increasing a character recognition rate by extracting store names within a predetermined radius using a location information system and comparing the extracted store names with character information received through a camera of a mobile phone.

2. Description of the Related Art

With the increased popularity of mobile phones equipped with a camera, a variety of different service scenarios are being developed. Particularly, work is currently being made for a service in which a store name is recognized by the camera of the mobile phone and additional information related to the store name is then provided to a user of the mobile phone. Additionally, another service for use while traveling recognizes a signboard and translates the signboard for the traveler.

Figure 1:
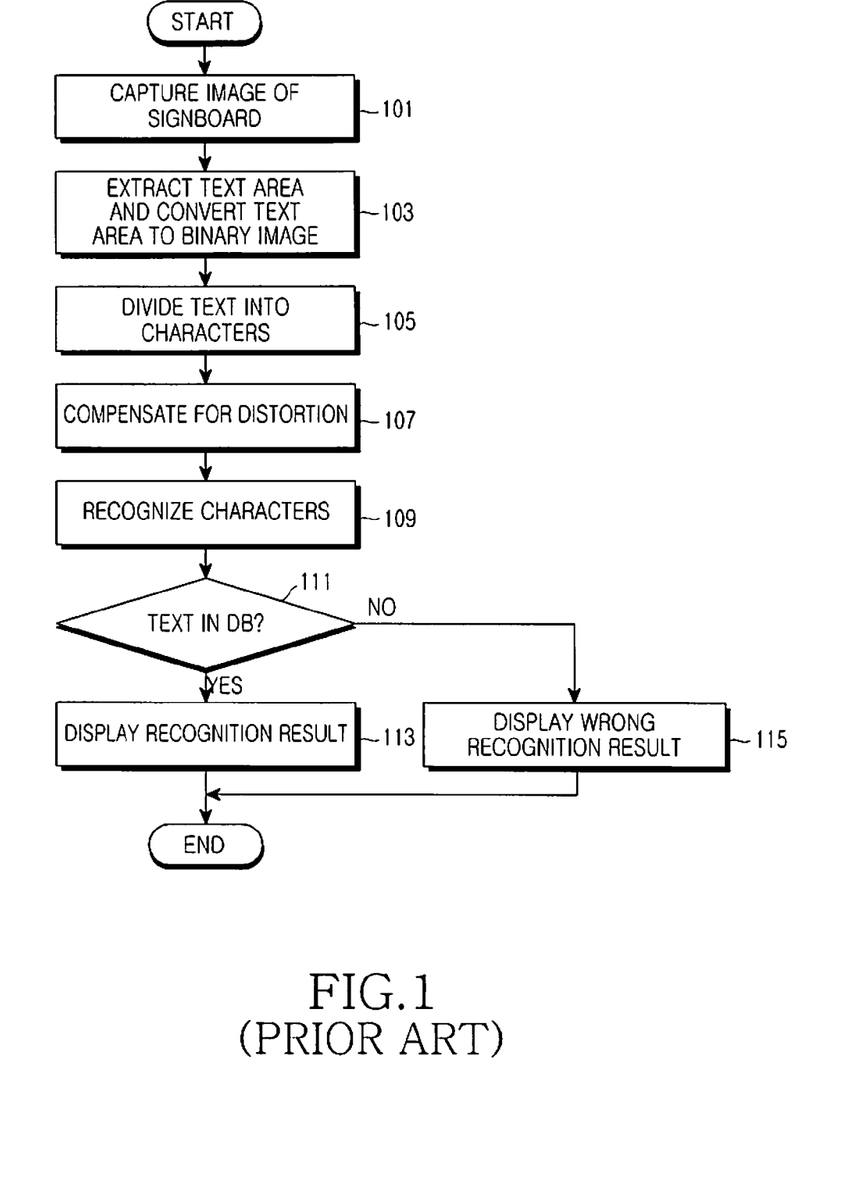
FIG. 1 is a flowchart illustrating a conventional operation for recognizing characters from a signboard in a mobile phone.

FIG. 1 is a flowchart illustrating a conventional operation for recognizing characters from a signboard in a mobile phone.

Referring to FIG. 1, a user captures an intended signboard using a camera of the mobile phone in step 101. In step 103, a text area is extracted from the captured image and converted to a black and white binary image. The binary text is segmented on a character basis in step 105, and distortion, such as noise, is compensated for in each character so that the character can be recognized normally in step 107. In step 109, each character is recognized through a character recognizer usually by best matching, exact matching, etc.

In step 111, to verify whether the text obtained by combining the compensated characters has been recognized successfully, it is determined whether the text is included in a database. Commonly, the database includes a dictionary function for determining whether the text has been recognized correctly. If the text is included in the database, the recognition result is displayed on an output portion of the mobile phone in step 113. Therefore, the user may search for related additional information. However, when the text is not included in the database, the user is notified that no valid text has been recognized in step 115.

When an intended signboard is captured by the camera of the mobile phone, it is not easy to analyze the captured image and recognize a text included in the captured image because various fonts and background images or colors that are available to signboards. Further, even from different images of the same signboard, the recognition rate of the same text from the signboard differs depending on lighting and a capturing angle. Further, if the text included in a signboard is a store name, the store name is often a proper noun in most cases, and therefore, it will not be recognized using the above-described dictionary function. Consequently, store names are difficult to recognize.

Figure 2A:
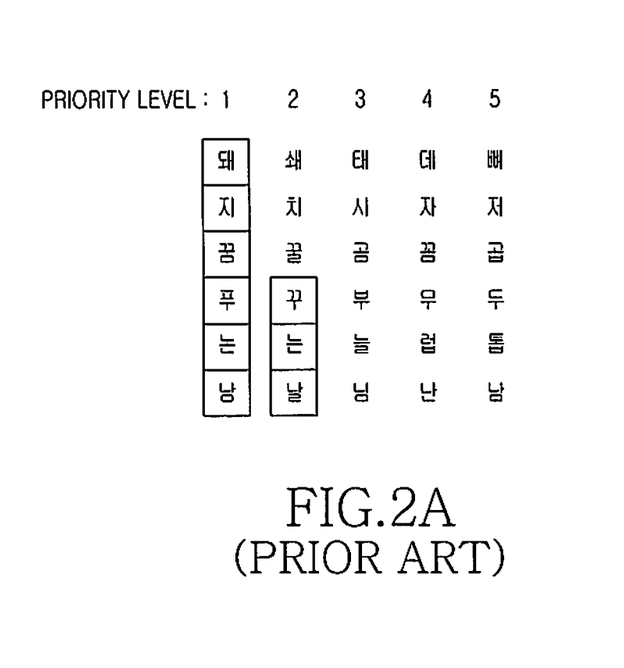
FIGS. 2A and 2B illustrate a conventional character recognition order.

FIGS. 2A and 2B illustrate a conventional character recognition order. For example, referring to FIG. 2A, when a store name "돼지 꿈꾸는 날" is recognized, the store name is divided on a character basis and best matching is applied to the individual characters, thus producing a recognition result. For each character, character candidates with first to fifth priority levels are extracted and only characters with the highest priority levels are selected as an output recognition results. While this technique may lead to an accurate recognition result, a wrong recognition result may be obtained according to the angle and lighting of image capturing, like "돼지꿈푸논납" illustrated in FIG. 2A.

Figure 2B:
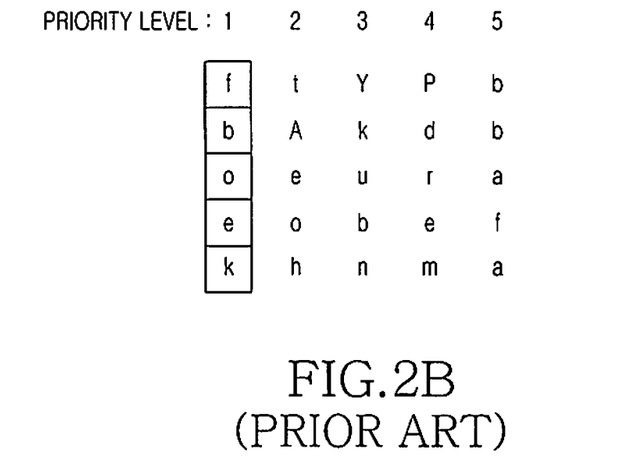

Referring to FIG. 2B, when a store name "ebook" is captured, the store name is divided on a character basis and best matching is applied to the individual characters, thus producing a recognition result. For each character, character candidates with first to fifth priority levels are extracted and only characters with the highest priority levels are selected as output recognition results. While this technique may lead to an accurate recognition result, a wrong recognition result may be obtained according to the angle and lighting of image capturing, like "Iboek" illustrated in FIG. 2B. Currently, there is no way to search for accurate additional information with the wrong recognition result.

SUMMARY OF THE INVENTION

The present invention has been designed to address at least the problems and/or disadvantages above, and to provide at least the advantages described below.

Accordingly, an aspect of the present invention is to provide an apparatus and method for quickly and accurately recognizing characters by extracting only store names within a predetermined radius around a user from a nationwide store name database using location information received, e.g., from a Global Positioning System (GPS), and comparing the extracted store names with character information included in a captured image of a signboard.

In accordance with an aspect of the present invention, there is provided a method for recognizing characters of an image captured using a camera, in which an image of a signboard is captured, text is extracted from the captured image, the extracted text is recognized, similar characters of up to a predetermined priority level are generated for each character of the recognized text, location information within a predetermined range from a current location of a user is acquired, at least one store name is extracted from the location information, at least one text is generated by combining the similar characters according to weights, the at least one text is compared with the extracted at least one store name, and a comparison result is output.

In accordance with another aspect of the present invention, there is provided a method for recognizing characters of an image captured using a camera, wherein an image of a signboard is captured, text is extracted from the captured imaged, the text is recognized, similar characters of up to a predetermined priority level are generated for each character included in the recognized text, location information within a predetermined range from a current location of a user is acquired, at least one store name is extracted from the location information, at least one text is generated by combining the similar characters according to weights, each character included in each of the at least one text is compared with each character included in each of the at least one store name in a predetermined order, and a comparison result is output.

In accordance with another aspect of the present invention, there is provided an apparatus for recognizing characters from an image captured using a camera. The apparatus includes a capturer that captures an image of a signboard and outputs the captured image, a pre-processor that extracts a text from the captured image and outputs the extracted text, a recognizer that recognizes the extracted text on a character basis, and a post-processor that generates at least one text by combining the recognized characters, compares the at least one text with at least one store names included in location information received from a GPS, and outputs a comparison result.

BRIEF DESCRIPTION OF THE DRAWINGS

The above and other aspects, features, and advantages of certain embodiments of the present invention will be more apparent from the following detailed description taken in conjunction with the accompanying drawings, in which.

Throughout the drawings, the same drawing reference numerals will be understood to refer to the same elements, features, and structures.

DETAILED DESCRIPTION OF EMBODIMENTS OF THE INVENTION

The matters defined in the description such as a detailed construction and elements are provided to assist in a comprehensive understanding of certain embodiments of the present invention. Accordingly, those of ordinary skill in the art will recognize that various changes and modifications of the embodiments described herein can be made without departing from the scope and spirit of the present invention. Also, descriptions of well-known functions and constructions are omitted for clarity and conciseness.

Conventionally, to recognize a text, a combination range is set for each character included in the text and extracted characters are combined. Therefore, if the text recognition is not accurate, a wrong recognition result is produced. To solve this problem, in accordance with an embodiment of the present invention, an apparatus and method are provided for accurately recognizing text by comparing store names, which are included in location information that is based on a current position of the mobile terminal received from, e.g., a Global Positioning System (GPS), with text of a captured image.

Figure 3:
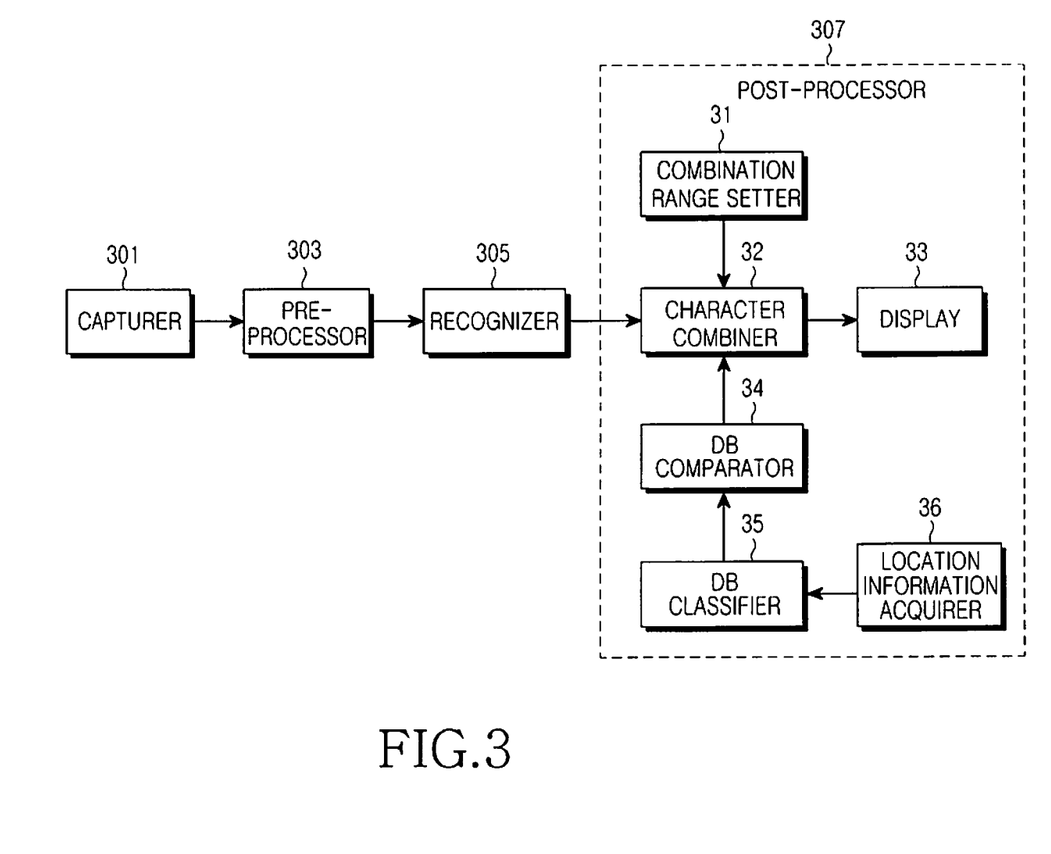
FIG. 3 is a block diagram of a mobile phone for recognizing a signboard according to an embodiment of the present invention.

FIG. 3 is a block diagram of a mobile phone for recognizing a signboard according to an embodiment of the present invention. Referring to FIG. 3, the mobile phone includes a capturer 301, a pre-processor 303, a recognizer 305, and a post-processor 307.

The capturer 301 captures a store name written on an intended signboard using a camera of the mobile phone. The pre-processor 303 extracts a text area from the image captured by the capturer 301, converts the text area to a binary black and white image, and compensates for distortion of the binary back and white image. The recognizer 305 recognizes the compensated binary text area on a character-by-character basis. The post-processor 307 determines whether text obtained by combining the characters recognized by the recognizer 305 is accurate by referring to a DataBase (DB), and corrects the text, if necessary. The post-processor 307 includes a combination range setter 31, a character combiner 32, a display 33, a DB comparator 34, a DB classifier 35, and a location information acquirer 36.

The combination range setter 31 extracts recognition results of up to a predetermined priority level for each character according to a weight of the character. The priority level may be predetermined by a manufacturer or a user. The character combiner 32 combines characters according to the recognition results extracted by the combination range setter 31. The character combiner 32 produces an accurate character combination in conjunction with the DB comparator 34.

The location information acquirer 36 acquires location information of an area within a predetermined range from a current position of the mobile phone and acquires additional information corresponding to the location information. For example, the current position of the mobile terminal can be provided using GPS. The location information includes all store names within the predetermined range. The DB classifier 35 separates the store names from the location information received from the location information acquirer 36 and stores the store names. Additionally, the additional information corresponding to the store names may also be separated and stored. The DB comparator 34 compares text obtained by combining the characters in the character combiner 32 with at least one name acquired from the DB classifier 35.

Figure 4:
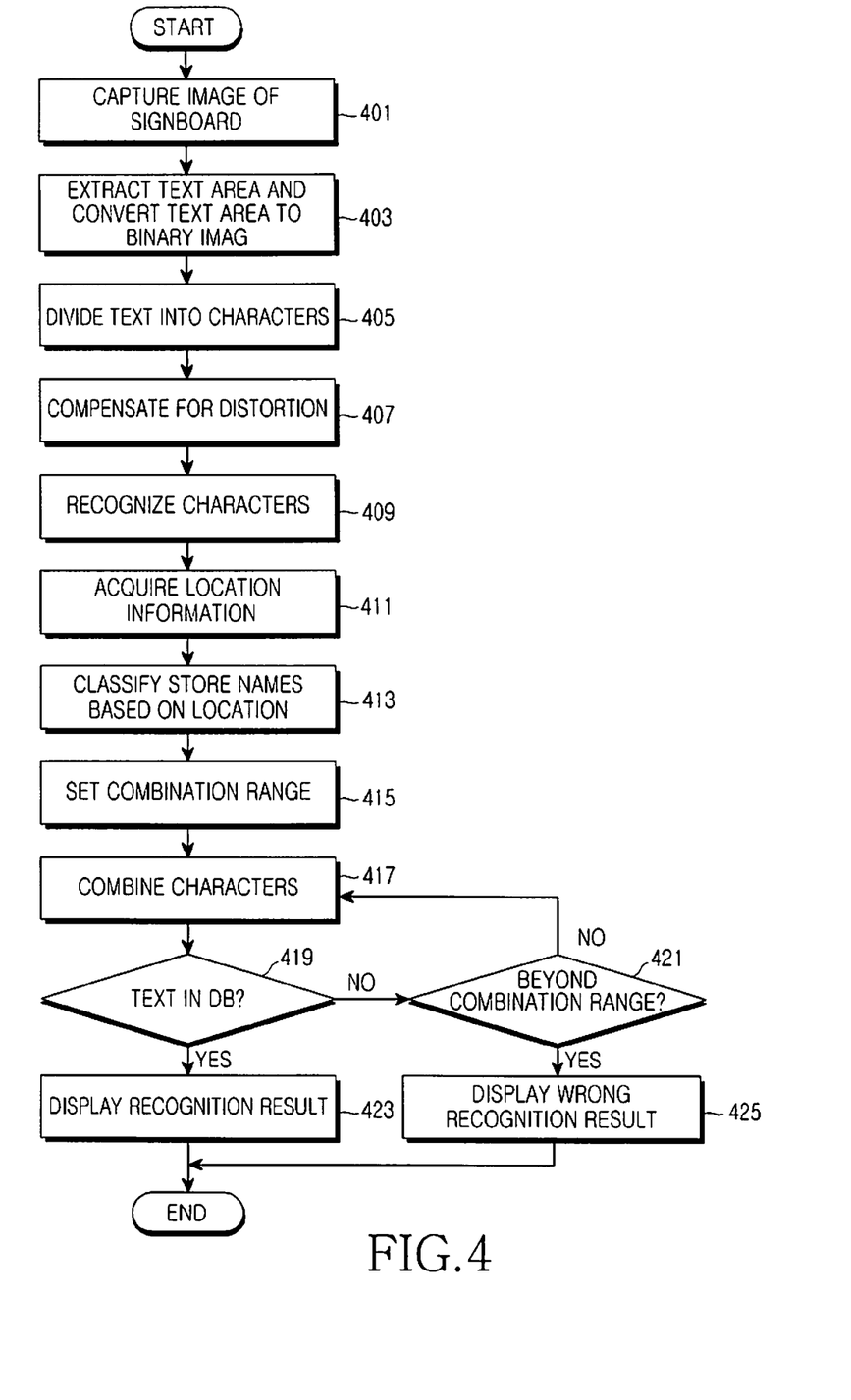
FIG. 4 is a flowchart illustrating an operation for recognizing characters included in a signboard by a GPS according to an embodiment of the present invention.

FIG. 4 is a flowchart illustrating an operation for recognizing text included in a signboard according to an embodiment of the present invention.

Referring to FIG. 4, a user captures an image of an intended signboard using a camera included in a mobile phone in step 401. In step 403, a text area is extracted from the captured image and converted to a binary black and white image to facilitate text recognition. The binary text is divided into characters in step 405 and the distortion of each character, such as noise, is compensated for in step 407, in order to accurately recognize the character. In step 409, each character is recognized by a character recognizer.

In step 411, location information of an area within a predetermined range from a current location of the mobile phone is acquired. For example, the current position of the mobile terminal can be provided using GPS. The location information includes store names within the predetermined range. For example, if a current location of the mobile phone on the campus of San Jose State University, the location information will include store names around San Jose State University.

In step 413, the store names are classified and stored in the mobile terminal. For example, all store names included in the location information may be extracted and stored, or only store names having as many characters as in the captured signboard may be extracted and stored.

In step 415, the mobile phone sets character combination ranges, i.e., recognition results of up to a predetermined priority level are extracted for each recognized character according to a weight of the character. For example, if six characters are recognized and a character combination range for each character is up to a fifth priority level, i.e., characters of first to fifth priority levels for each recognized character, 30 weighted characters may be extracted (for illustration, characters of up to a fifth priority level are extracted for each character in FIGS. 2A and 2B).

In step 417, characters are combined to text in a descending order of weights according to the combination range. If the combination range of each character is first to fifth priority levels, the number of the resulting combined texts is 15,625.

Each text is compared with the stored store names in step 419. If the text does not match any of the store names stored in the DB and there are still combinations to try in step 421, steps 417 and 419 are repeated within a range that does not exceed the combination range. If there is no text matching any of the store names stored in the DB despite completed character combining in step 421, the text obtained by combining characters with the highest priority levels is displayed on an output portion of the mobile phone, notifying that the text is not in the DB in step 425. However, upon detection of a text matching a store name stored in the DB in step 419, the text is displayed on the output portion of the mobile phone in step 423.

Figure 5:
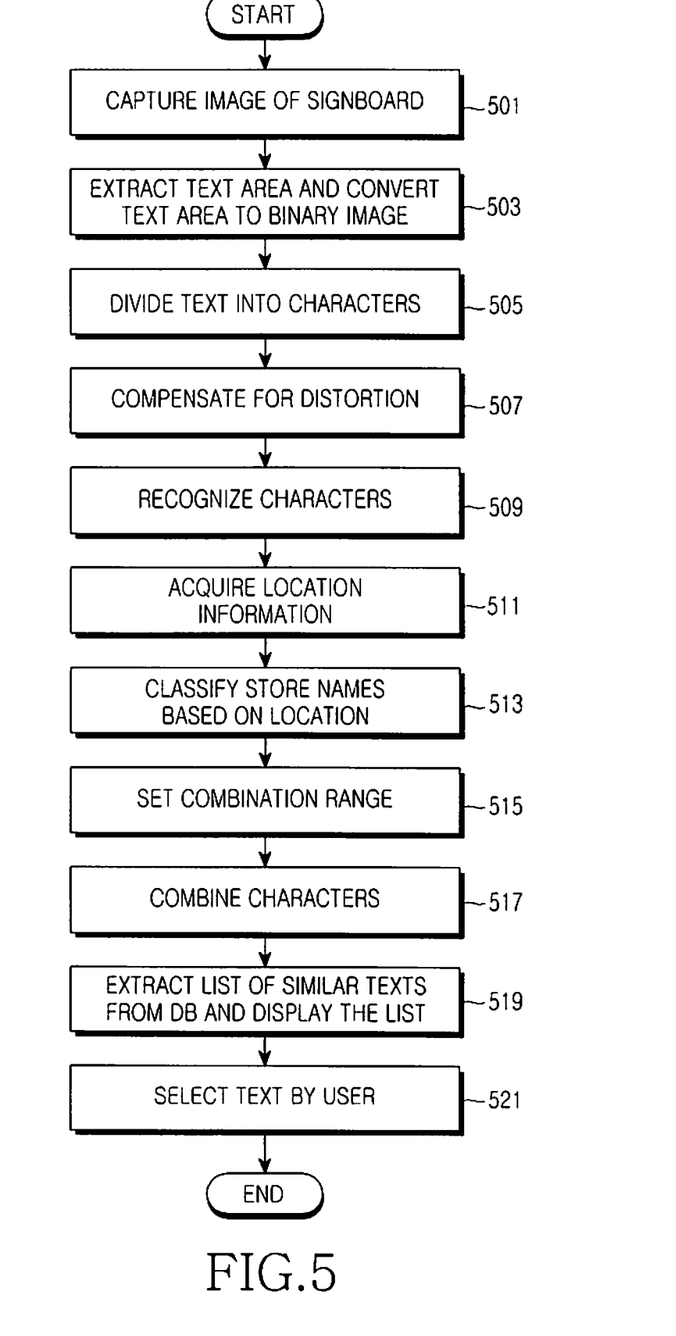
FIG. 5 is a flowchart illustrating an operation for selecting text similar to text included in a signboard according to an embodiment of the present invention.

FIG. 5 is a flowchart illustrating an operation for selecting a text similar to a text included in a signboard according to an embodiment of the present invention. More specifically, while two recognition results are output in FIG. 4, in FIG. 5 more character combinations are output to the user at one time, e.g., in a list, such that a user may select a combination.

Referring to FIG. 5, the user captures an image of an intended signboard using a camera included in a mobile phone in step 501. In step 503, a text area is extracted from the captured image and converted to a binary black and white image to facilitate text recognition. The binary text is divided into characters in step 505 and the distortion of each character such as noise is compensated for in step 507, in order to accurately recognize the character. In step 509, each character is recognized by a character recognizer.

In step 511, location information of an area within a predetermined range from a current location of the mobile phone is acquired. For example, the current position of the mobile terminal can be provided using GPS. The location information includes store names within the predetermined range.

In step 513, the store names are classified and stored in the mobile terminal. For example, all store names included in the location information may be extracted and stored, or only store names having as many characters as in the captured signboard may be extracted and stored.

In step 515, the mobile phone sets character combination ranges, i.e., recognition results of up to a predetermined priority level are extracted for each recognized character according to a weight of the character. In step 517, characters are combined to text in a descending order of weights according to the combination ranges.

Store names similar to the generated text are classified and output sequentially by comparing the store names stored in the DB with the generated text in step 519. For example, to classify a store name as similar to the generated text, the store name is compared with the text on a character-by-character basis and if the store name matches to text by a predetermined number of characters, the store name is determined to be a similar store name. The number of similar store names to be output is freely set by the manufacturer or the user. In step 521, the user may select an intended text from among a predetermined number of texts output to the output portion.

Figure 6:
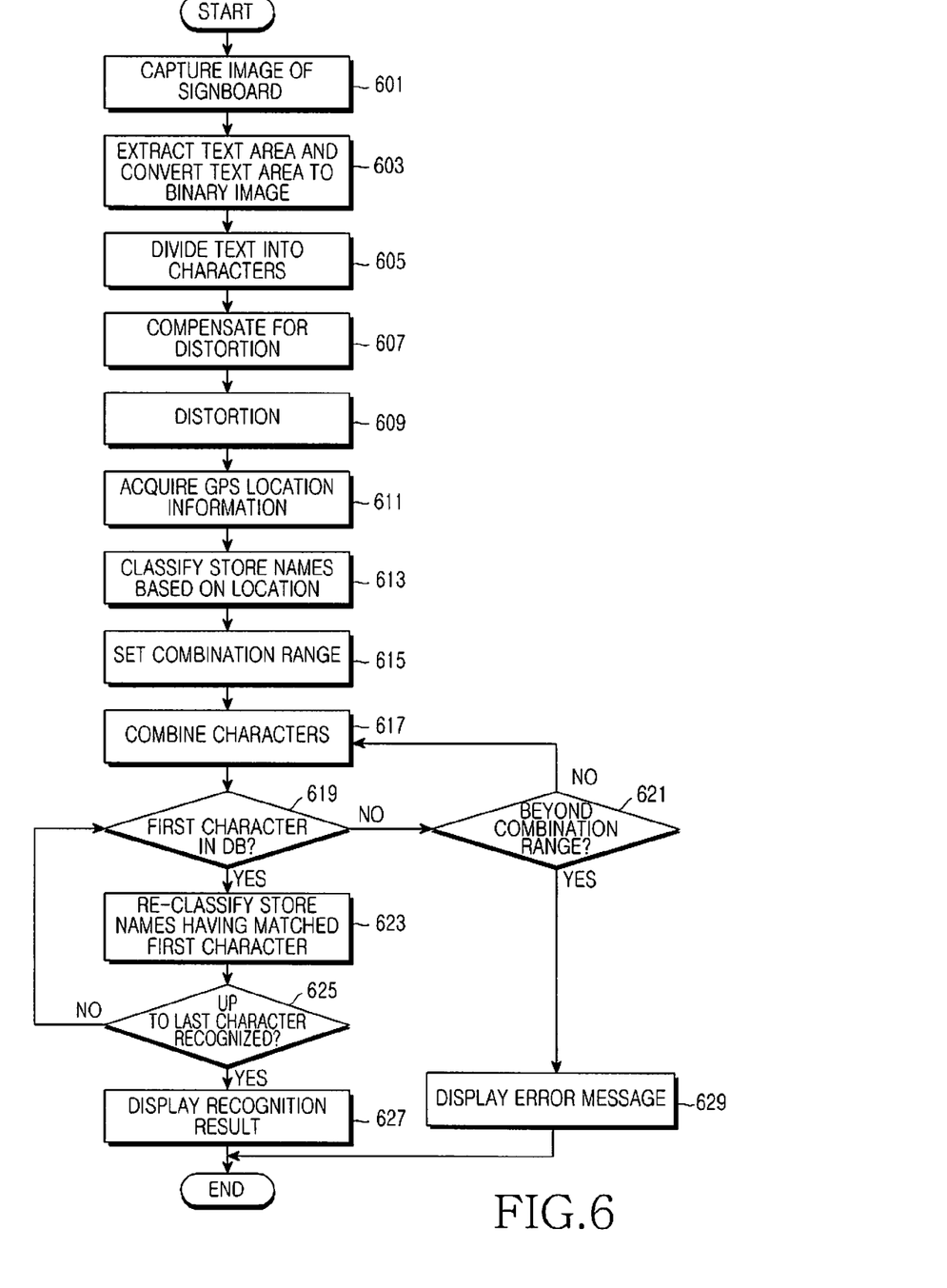
FIG. 6 is a flowchart illustrating an operation for comparing store names included in a database with text included in a signboard on a character basis according to an embodiment of the present invention.
Figure 7:
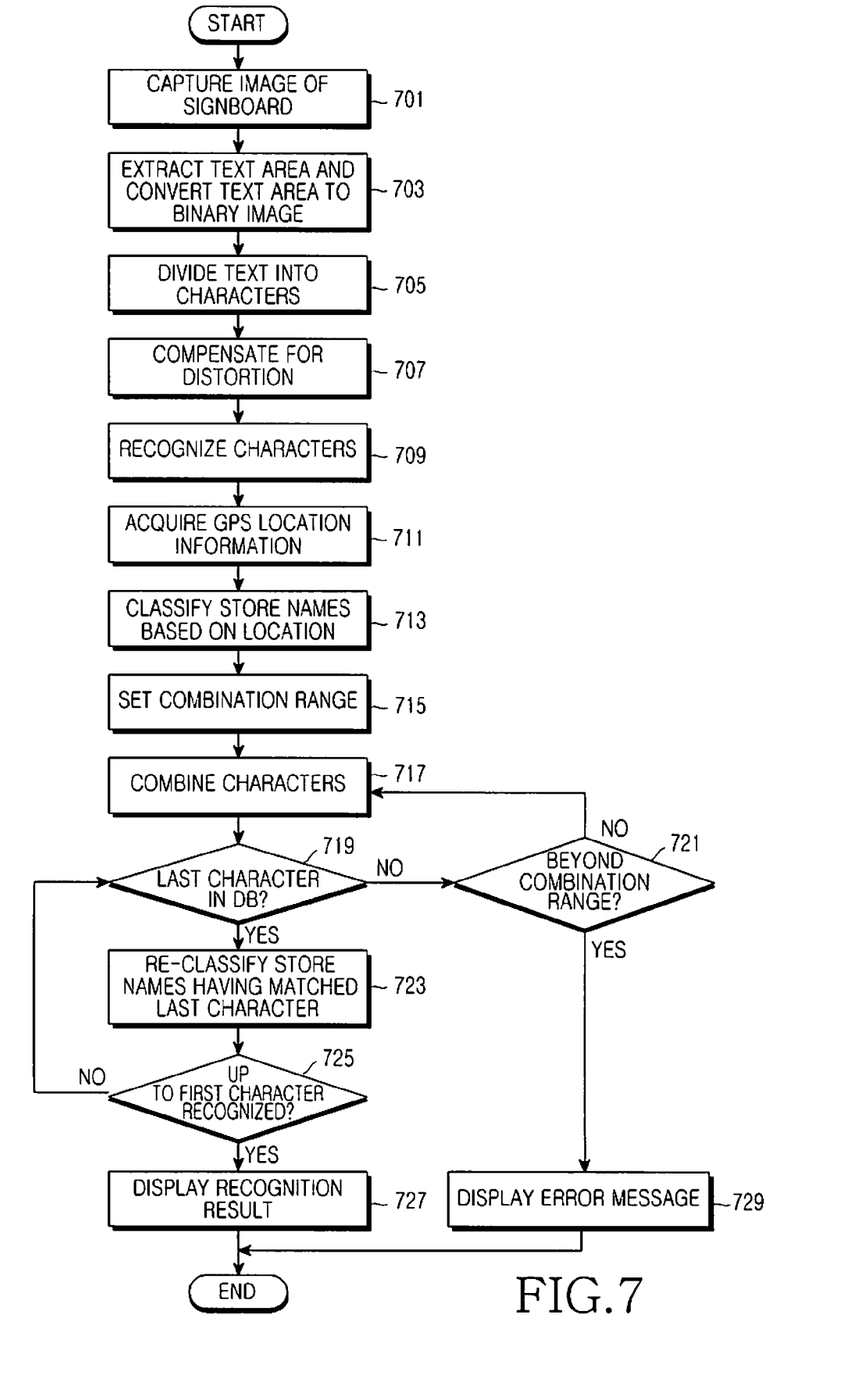
FIG. 7 is a flowchart illustrating an operation for comparing store names included in a database with text included in a signboard on a character basis according to another embodiment of the present invention.

FIGS. 6 and 7 are flowcharts illustrating operations for comparing store names included in the DB with a text included in an image of a signboard according to embodiments of the present invention. More specifically, in FIG. 6, the comparison begins with the first character of a recognized text, whereas in FIG. 7, the comparison begins with the last character of the recognized text.

In FIG. 6, steps 601 to 617 are equivalent to steps 501 and 517 of FIG. 5, which were described above. Accordingly, a description of these steps will not be repeated below.

Referring to FIG. 6, in step 619, the mobile phone determines whether the first character of a specific text matches the first character of any store name included in the DB. If the first character of the text does not match the first character of any store name included in the DB and there are still possible first character combinations in step 621, steps 617 and 619 are repeated until a text having the first character matching the first character of any store name in the DB is detected, or until there are no more first character combinations available in step 621. If none of the first characters of the texts match any of the first characters of the store names included in the DB and there are no more first character combinations available in step 621, a message indicating no store name matching the text is output on the display in step 629.

When there is at least one store name having the first characters matching the first characters of texts in step 619, the store names and the texts are re-classified in step 623. For example, if the first characters of the texts are "돼", "되" and "대", these characters are compared with the first characters of store names stored in the DB and store names each having the first character being "돼", "되" or "대" are re-classified. If there is no store name having the first character being "대", only the other texts having their first characters being "돼" or "되" are re-classified. The next character within the re-classified combination range is compared with the next character of the re-classified store names in step 625 and the comparison results are re-classified.

As another example, if the first characters of the texts are "e", "f" and "o", these characters are compared with the first characters of store names stored in the DB and store names each having the first character being "e", "f" or "o" are re-classified. If there is no store name having the first character being "o", only the other texts having their first characters being "e" or "f" are re-classified. The next character within the re-classified combination range is compared with the next character of the re-classified store names and the comparison results are re-classified. When there is a store name matching the text in the first to last characters, the store name is displayed on the display in step 627.

In FIG. 7, steps 701 to 729 are equivalent to steps 601 and 629 of FIG. 6, which were described above, except that 719 starts with a last character instead of a first character as in step 619. Accordingly, a description of these steps will not be repeated below.

For example, referring to FIG. 7, when there is a store name having a last character matching a last character of a text, the store names and the texts are re-classified in step 723. That is, if the last characters of the texts are "날", "남" and "낭", these characters are compared with the last characters of store names stored in the DB and store names each having the last character being "날", "남" or "낭" are re-classified. If there is no store name having the last character being "낭", only the other texts having their last characters being "ㅂ" or "ㅂ" are re-classified. The second to last character within the re-classified combination range is compared with the second to last character of the re-classified store names in step 725 and the comparison results are re-classified.

As another example, the last characters of the texts are "k", "h" and "l", these characters are compared with the last characters of store names stored in the DB and store names each having the last character being "k", "h" or "l", are re-classified. If there is no store name having the last character being "l", only the other texts having their last characters being "k" or "h" are re-classified. The second to last character within the re-classified combination range is then compared with the second to last character of the re-classified store names and the comparison results are re-classified. When there is a store name matching a text in the last to first characters, the store name is displayed on the display in step 727.

The comparison and re-classification operations of FIGS. 6 and 7 reduce the number of comparisons. Further, if only one re-classified text remains before the first or last character comparison, it is also possible to display this directly on the display without performing another reclassification.

As is apparent from the above description above, the above-described embodiments of the present invention extract a text area from image of a signboard captured using a camera, and increase the recognition rate of the text area based on location information relating to a current position of the user. Therefore, information can be searched for fast and accurately.

While the present invention has been shown and described with reference to certain embodiments thereof, it will be understood by those skilled in the art that various changes in form and details may be made therein without departing from the spirit and scope of the present invention as defined by the appended claims and their equivalents.

What is claimed is:

1. A method for recognizing characters of an image captured using a camera in a mobile terminal, comprising:
    capturing, by the camera, an image of a signboard;
    extracting a text area from the captured image of the signboard;
    recognizing characters from the extracted text area;
    generating similar characters of up to a predetermined priority level for each of the recognized characters of the extracted text area;
    acquiring location information of an area within a predetermined range from a current position of the mobile terminal;
    extracting at least one store name from the location information;
    generating at least one text by combining the similar characters according to weights;
    comparing the at least one text with the extracted at least one store name; and
    outputting a comparison result.

2. The method of claim 1, wherein recognizing the characters from the extracted text area comprises:
    converting the extracted text area to a binary black and white text area;
    dividing the binary text area into the characters;
    compensating for distortion of each of the characters; and
    recognizing each of the compensated characters.

3. The method of claim 1, wherein generating the similar characters comprises generating similar results up to a predetermined priority level in a descending order of weights, for each of the characters.

4. The method of claim 1, further comprising:
    classifying the at least one store name included in the location information, and storing the classified at least one store name in a database.

5. The method of claim 4, wherein storing the classified at least one store name comprises:
    separating only store names having as many characters as the characters from the extracted text area; and
    storing the separated store names.

6. The method of claim 1, wherein comparing the at least one text with the extracted at least one store name comprises:
    comparing each of the at least one text with the extracted at least one store name, until a text matching any extracted store name is detected, and
    wherein outputting the comparison result comprises:
    outputting the text matching any extracted store name; and
    outputting a text obtained by combining similar characters with highest weights on a character-by-character basis, if no text matches to any extracted store name.

7. The method of claim 1, wherein comparing the at least one text with the extracted at least one store name comprises:
    identifying store names similar to the at least one text, and
    wherein outputting the comparison result comprises:
    outputting similar store names, for user selection.

8. The method of claim 7, wherein identifying the store names similar to the at least one text comprises:
    comparing characters of the at least one text with characters of the extracted at least one store name; and
    identifying store names that are identical to the at least one text in a predetermined number of characters.

9. The method of claim 1, wherein the current position of the mobile terminal is determined by a Global Positioning System (GPS).

10. The method of claim 1, wherein comparing the at least one text with the extracted at least one store name comprises:
    comparing each character included in each of the at least one text with each character included in each of the at least one extracted store name in a predetermined order.

11. The method of claim 1, wherein comparing the at least one text with the extracted at least one store name comprises:
    comparing a first character of each of the at least one text with a first character of each of the at least one extracted store name;
    primarily re-classifying store names each having the first character identical to the first character of any of the at least one text;
    comparing a second character of each of the re-classified store names with a second character of each of the at least one text;
    secondarily re-classifying store names each having the second character identical to the second character of any of the at least one text among the re-classified store names; and
    repeating the secondary re-classification, until comparison is completed over all characters included in the at least one text.

12. The method of claim 1, wherein comparing the at least one text with the extracted at least one store name comprises comparing each character included in each of the at least one text with each character included in each of the at least one extracted store name in a last-to-first character order.

13. An apparatus for recognizing characters from a captured image, comprising:
    a capturer for capturing an image of a signboard and outputting the captured image;
    a pre-processor for extracting a text area from the captured image and outputting the extracted text area;

a recognizer for recognizing characters from the extracted text area; and a post-processor for generating at least one text by combining the recognized characters, comparing the at least one text with at least one store name within a predetermined range, and outputting a comparison result.

14. The apparatus of claim 13, wherein the at least one store name is received in location information of an area within the predetermined range from a current position of the apparatus.

15. The apparatus of claim 14, wherein the current position of the apparatus is determined by a Global Positioning System (GPS).

16. The apparatus of claim 13, wherein the pre-processor converts the extracted text area to a binary black and white text area, divides the binary text area into characters, and compensates for distortion of each of the characters, to facilitate recognition of the text.

17. The apparatus of claim 13, wherein the post-processor comprises:

a combination range setter for generating at least one similar character up to a predetermined priority level for each of the characters according to weights and storing the similar characters;

a character combiner for generating the at least one text by combining the at least one similar characters according to the weights;

a location information acquirer for acquiring the location information;

a database classifier for separating the at least one store name included in the location information and storing the at least one store name; and a database comparator for comparing the at least one text with the at least one store name.

* * * * *